United States Patent
Guerra et al.

(10) Patent No.: US 10,472,179 B2
(45) Date of Patent: Nov. 12, 2019

(54) CARTRIDGE BEARING ASSEMBLY FOR ROLLER CONVEYORS

(71) Applicant: Lewco, Inc., Sandusky, OH (US)

(72) Inventors: Gerald T. Guerra, Sandusky, OH (US); Albert E. Sparling, Sandusky, OH (US); Charles J. Fresch, Sandusky, OH (US)

(73) Assignee: LEWCO, INC., Sandusky, OH (US)

( * ) Notice: Subject to any disclaimer, the term of this patent is extended or adjusted under 35 U.S.C. 154(b) by 35 days.

(21) Appl. No.: 15/917,157

(22) Filed: Mar. 9, 2018

(65) Prior Publication Data

US 2018/0257870 A1  Sep. 13, 2018

Related U.S. Application Data

(60) Provisional application No. 62/469,124, filed on Mar. 9, 2017.

(51) Int. Cl.
| | |
|---|---|
| *B65G 39/09* | (2006.01) |
| *F16C 19/54* | (2006.01) |
| *B65G 39/02* | (2006.01) |
| *F16C 13/02* | (2006.01) |
| *B65G 39/12* | (2006.01) |

(52) U.S. Cl.
CPC .......... *B65G 39/09* (2013.01); *B65G 39/025* (2013.01); *F16C 13/022* (2013.01); *B65G 39/12* (2013.01); *B65G 2207/48* (2013.01); *F16C 2326/58* (2013.01)

(58) Field of Classification Search
CPC ....... B65G 39/09; B65G 39/025; F16C 19/54; F16C 13/022
USPC .............................. 198/780, 781.04; 193/37
See application file for complete search history.

(56) References Cited

U.S. PATENT DOCUMENTS

| | | | | |
|---|---|---|---|---|
| 3,793,689 | A * | 2/1974 | Specth | B65G 39/02 193/37 |
| 4,043,616 | A | 8/1977 | Zimmer | |
| 4,213,523 | A | 7/1980 | Frost et al. | |
| 5,380,104 | A | 1/1995 | Garnett | |
| 5,769,204 | A | 6/1998 | Okada et al. | |
| 5,865,290 | A * | 2/1999 | Scott | B65G 39/12 193/37 |
| 6,053,298 | A | 4/2000 | Nimmo et al. | |
| 6,554,117 | B2 * | 4/2003 | Henson | B65G 39/09 193/35 B |
| 6,782,996 | B1 | 8/2004 | Wolf | |
| 6,868,961 | B2 * | 3/2005 | Ehlert | B65G 47/261 198/781.01 |
| 7,028,825 | B2 | 4/2006 | Scott | |
| 7,290,649 | B2 * | 11/2007 | Wolkerstorfer | B65G 13/073 198/781.01 |

(Continued)

*Primary Examiner* — Douglas A Hess
(74) *Attorney, Agent, or Firm* — Shumaker, Loop & Kendrick, LLP; James D. Miller

(57) ABSTRACT

A cartridge bearing assembly for a roller conveyor system includes a housing having a first end, a second end opposing the first end, an inner surface, and an outer surface. A pair of bearings is spaced from each other and disposed in the housing. An shaft is received by the pair of bearings. The shaft is formed from a plastic material. A spring is disposed about a first portion of the shaft intermediate the pair of bearings. The spring biases the shaft outwardly from the first end of the housing.

14 Claims, 5 Drawing Sheets

(56) References Cited

U.S. PATENT DOCUMENTS

| | | | |
|---|---|---|---|
| 8,292,056 B2 * | 10/2012 | Tsugawa | B65G 13/073 |
| | | | 193/35 B |
| 8,727,105 B2 | 5/2014 | Scott et al. | |
| 9,677,211 B1 * | 6/2017 | Damour | D06C 3/06 |
| 2003/0034222 A1 * | 2/2003 | Gamache | |
| 2007/0261933 A1 | 11/2007 | Scott | |
| 2009/0045029 A1 | 2/2009 | Deur | |
| 2016/0101943 A1 | 4/2016 | Guerra | |

* cited by examiner

CARTRIDGE BEARING ASSEMBLY FOR ROLLER CONVEYORS

CROSS-REFERENCE TO RELATED APPLICATIONS

This application claims the benefit of U.S. Provisional Patent Application Ser. No. 62/469,124, filed on Mar. 9, 2017. The entire disclosure of the above patent application is hereby incorporated herein by reference.

FIELD OF INVENTION

The invention relates to conveyor rollers and more particularly to a cartridge bearing assembly for conveyor rollers.

BACKGROUND

Commonly, a singulator conveyor system is used for alignment and singulation of packages, goods, and materials. An example of a singulator conveyor system is disclosed in U.S. Pat. No. 5,769,204, hereby incorporated herein by reference in its entirety. For example, the singulator conveyor system is employed in packaging facilities such as courier facilities so packaging can be identified and automatically processed through sorting equipment. The singulator conveyor system has skewed or angled rollers to move the packages to one side of the singulator conveyor system, typically along a guard rail or an edge guide. A technique of gradually increasing a surface speed of the singulator conveyor system is used to create gaps between individual ones of the packages, resulting in the packages being aligned in a single file orientation. The most common singulator conveyor system design incorporates a flat drive belt that contacts the rollers and provides drive through friction. Such a conveyor system is identified by the Conveyors Equipment Manufacturers Association (CEMA) as a belt driven live roller conveyor (BDLR).

Because the rollers on the singulator conveyor system are not perpendicular to a side frame, a series of drive motors and drive belts are needed instead of a single drive belt in order to drive rollers over an entire length of the singulator conveyor system. The series of drive belts forms wear patterns on the rollers. Since the singulator conveyor system requires the series of the drive belts, consequently, there are also a large number of moving parts resulting in significant maintenance efforts and manufacturing costs.

The conveyor system typically consist of tubular rollers. For certain material handling applications, the rollers are driven by a torque transmitting mechanism such as a friction belt, multi-V belt, chain, timing belt or other types of belts, for example. The torque transmitting mechanism typically engages with a hub of the rollers. However, the typical construction of the rollers used in this type of conveyor is complex due to a high duty cycle and a requirement for minimal maintenance of the conveyor rollers. The conveyor rollers have a combination of machined components and welded sub-assemblies to create a double, spring loaded shaft assembly that is continuous throughout an entire length of the roller. The spring loading causes the shaft assembly to urge a shaft outwardly from ends of the rollers as the shaft and/or conveyor frame begins to wear. As a result, the rollers remain properly mounted within the conveyor frame. However, as mentioned above, these assemblies are complex and can be costly to manufacture and are unable to withstand heavier loads and higher speeds or loads applied to the rollers. Additionally, rollers disposed perpendicular to the frame also include complex assemblies similar to the disposed at an angle.

Other examples of rollers with spring loaded components are shown and described in U.S. Pat. Nos. 5,380,104, 6,053,298, and U.S. Pat. Appl. Pub. No. 2007/0261933, the disclosures of which are hereby incorporated by reference herein in their entirety. However, these examples of spring loaded rollers are also complex, costly to manufacture and maintain, difficult to assemble, and also may not be able to withstand higher speeds or heavier loads of rollers.

Therefore, it would be desirable to provide a cartridge bearing assembly for a conveyor roller configured for use with a torque transmitting device that minimizes wear and maintenance, facilitates ease of assembly, and minimizes manufacturing costs and complexity of the conveyor rollers.

SUMMARY OF THE INVENTION

In accordance and attuned with the present invention, a cartridge bearing assembly for a conveyor roller configured for use with torque transmitting devices that minimizes wear and maintenance, facilitates ease of assembly, and minimizes manufacturing costs and complexity of the conveyor rollers has surprisingly been discovered.

According to an embodiment of the disclosure, a cartridge bearing assembly for a roller conveyor system is disclosed. The cartridge bearing assembly includes a housing having a first end, a second end opposing the first end, an inner surface, and an outer surface, a pair of bearings disposed in the housing and spaced from each other, a shaft received by the pair of bearings, the shaft formed from a plastic material, and a spring disposed about a first portion of the shaft intermediate the pair of bearings, the spring biasing the shaft axially outwardly from the second end of the housing.

According to another embodiment of the disclosure, a cartridge bearing assembly for a roller conveyor system includes a housing having a first end configured for insertion into a roller, a second end opposing the first end, an inner surface, and an outer surface. A pair of bearings are disposed in the housing and spaced from each other. Each of the pair of bearings have substantially equal outer diameters. A shaft is received by the pair of bearings. A spring is disposed about a first portion of the shaft intermediate the pair of bearings. The spring is biasing the shaft axially outwardly from the second end of the housing.

According to yet another embodiment of the disclosure, a roller assembly for a roller conveyor system is disclosed. The roller assembly includes a tubular roller and a cartridge bearing assembly received in an end of the roller. The cartridge bearing assembly includes a housing having a first end configured for insertion into the roller, a second end opposing the first end, an inner surface, and an outer surface. A pair of bearings are disposed in the housing and spaced from each other. A shaft is received by the pair of bearings. A first end of the shaft is disposed within the housing spaced from the first end of the housing and a second end of the shaft is disposed outwardly from the second end of the housing. A spring is disposed about a first portion of the shaft intermediate the pair of bearings. The spring biasing the shaft axially outwardly from the second end of the housing.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings which.

DETAILED DESCRIPTION OF THE INVENTION

Figure 1:
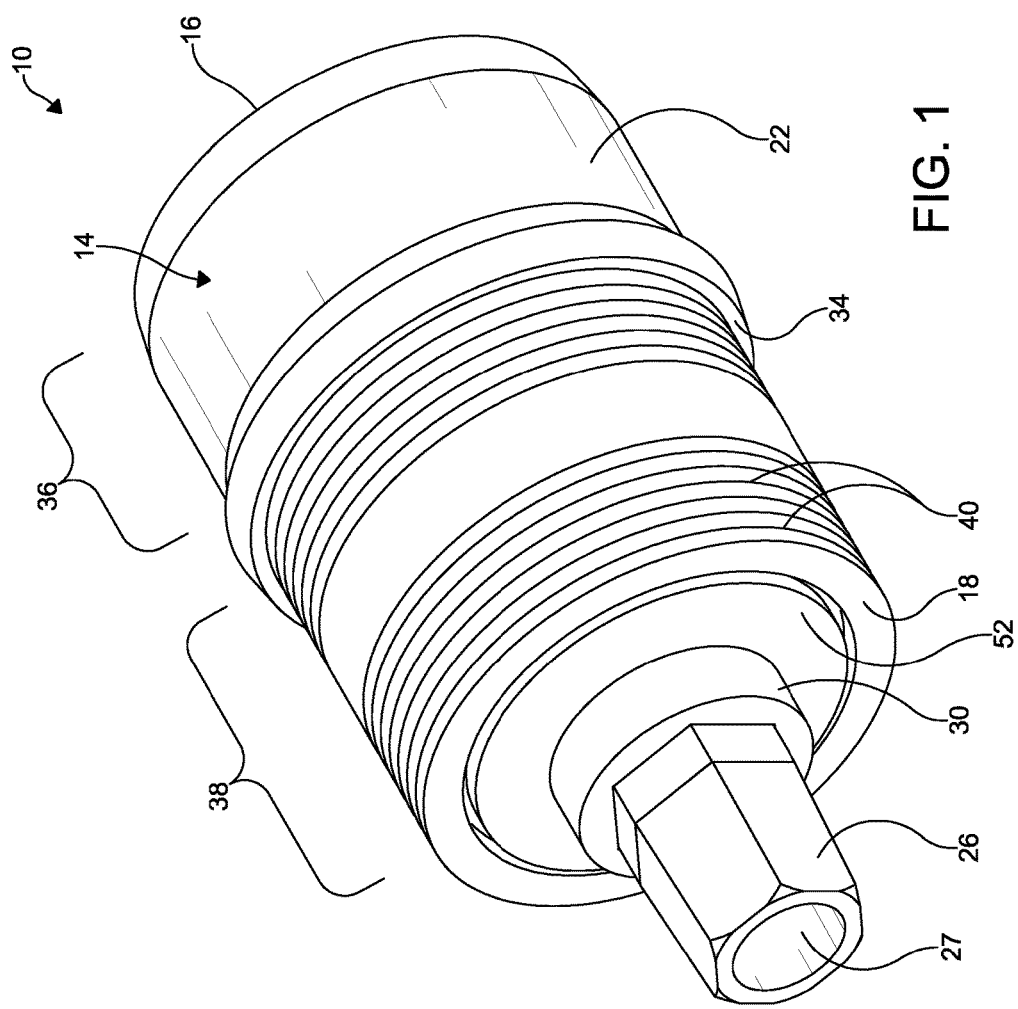
FIG. 1A is a top perspective view of a cartridge bearing assembly according to an embodiment of the invention.
FIG. 1B is a fragmentary top perspective view of the cartridge bearing assembly of FIG. 1A with engagement members according to an alternate embodiment of the invention.
FIG. 1C is a fragmentary top perspective view of the cartridge bearing assembly of FIG. 1A with engagement members according to an alternate embodiment of the invention.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical. As used herein, substantially is defined at "to a considerable degree" or "proximate" or as otherwise understood by one ordinarily skilled in the art.

FIGS. 1A-4 illustrate a cartridge bearing assembly 10 configured for coupling to an end of a roller 12 employed in a roller conveyor system (not shown) according to an embodiment of the disclosure. The cartridge bearing assembly 10 is particularly advantageous for a roller employed in a singulation type roller conveyor system. As described herein, a singulation type roller conveyor system refers to a conveyor configured to receive randomly oriented and positioned articles to be conveyed and orient and/or align the articles in a desired configuration or pattern such as single file along a direction of travel. By positioning and orienting the articles, the articles can be conveyed to another conveyor system or other assembly line system or facility one at a time, for example. In other examples, the articles oriented in single file can be more efficiently scanned, tagged, tracked, observed for quality, or otherwise manipulated or observed. In order to orient and align the articles in single file, at least some of the rollers 12 of the roller conveyor system are skewed, or disposed at an angle, with respect to the direction of travel or with respect to sides of a conveyor frame. However, it is understood the rollers 12 with the cartridge bearing assemblies 10 can be employed in other live roller conveyor systems, if desired.

The cartridge bearing assembly 10 includes a housing 14 having a first end 16 and an opposing second end 18. The housing 14 is substantially cylindrical and defines an inner surface 20 and an outer surface 22. The housing 14 is configured to house a pair of bearings 24 including a first bearing 24a and a second bearing 24b, an shaft 26, a spring 28, an insert 30, and a retaining ring 32.

A flange 34 extends radially outwardly from the outer surface 22 of the housing 14. The flange 34 is formed intermediate the first end 16 of the housing 14 and the second end 18 of the housing 14 and separates the outer surface 22 of the housing 14 into a roller engagement portion 36 and a torque transmitter engagement portion 38. The roller engagement portion 36 is adjacent the first end 16 of the housing 14 and the torque transmitter engagement portion 38 is adjacent the second end 18 of the housing 14.

Figure 1B:
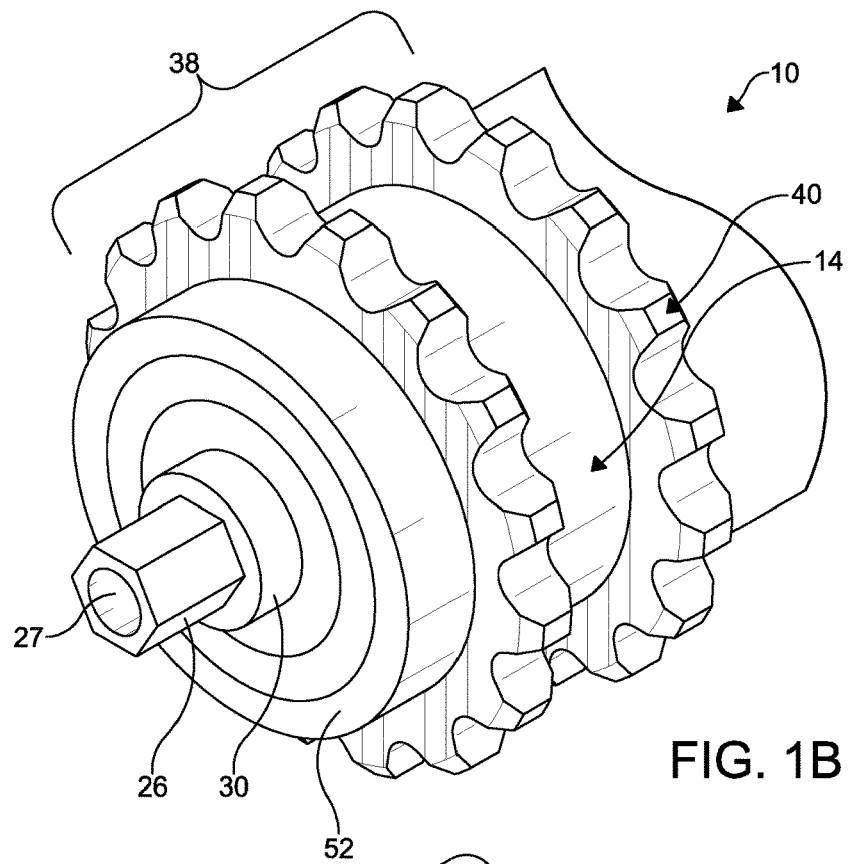
Figure 1C:
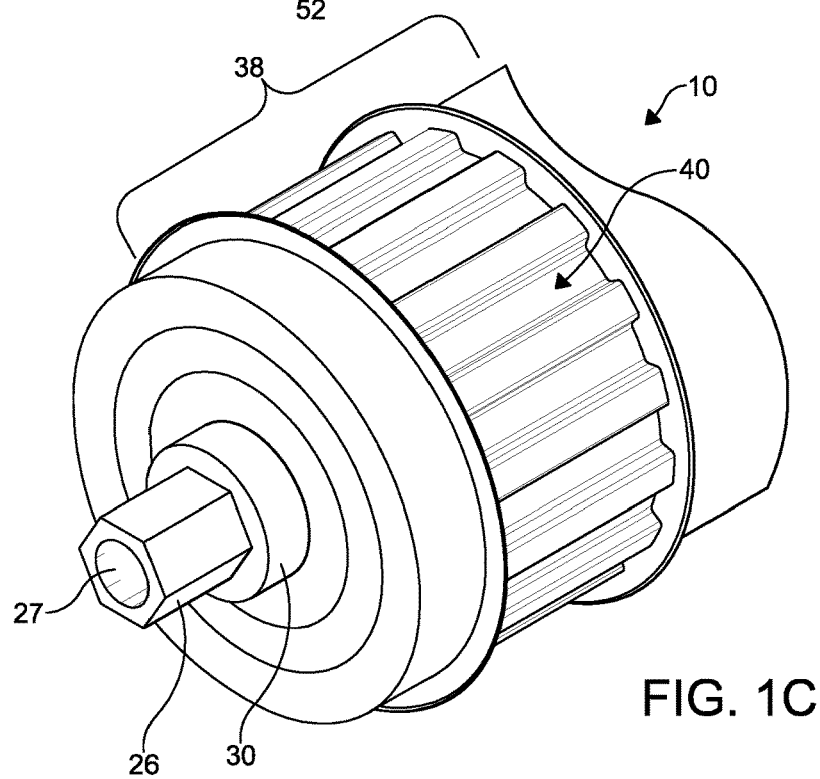
Figure 2:
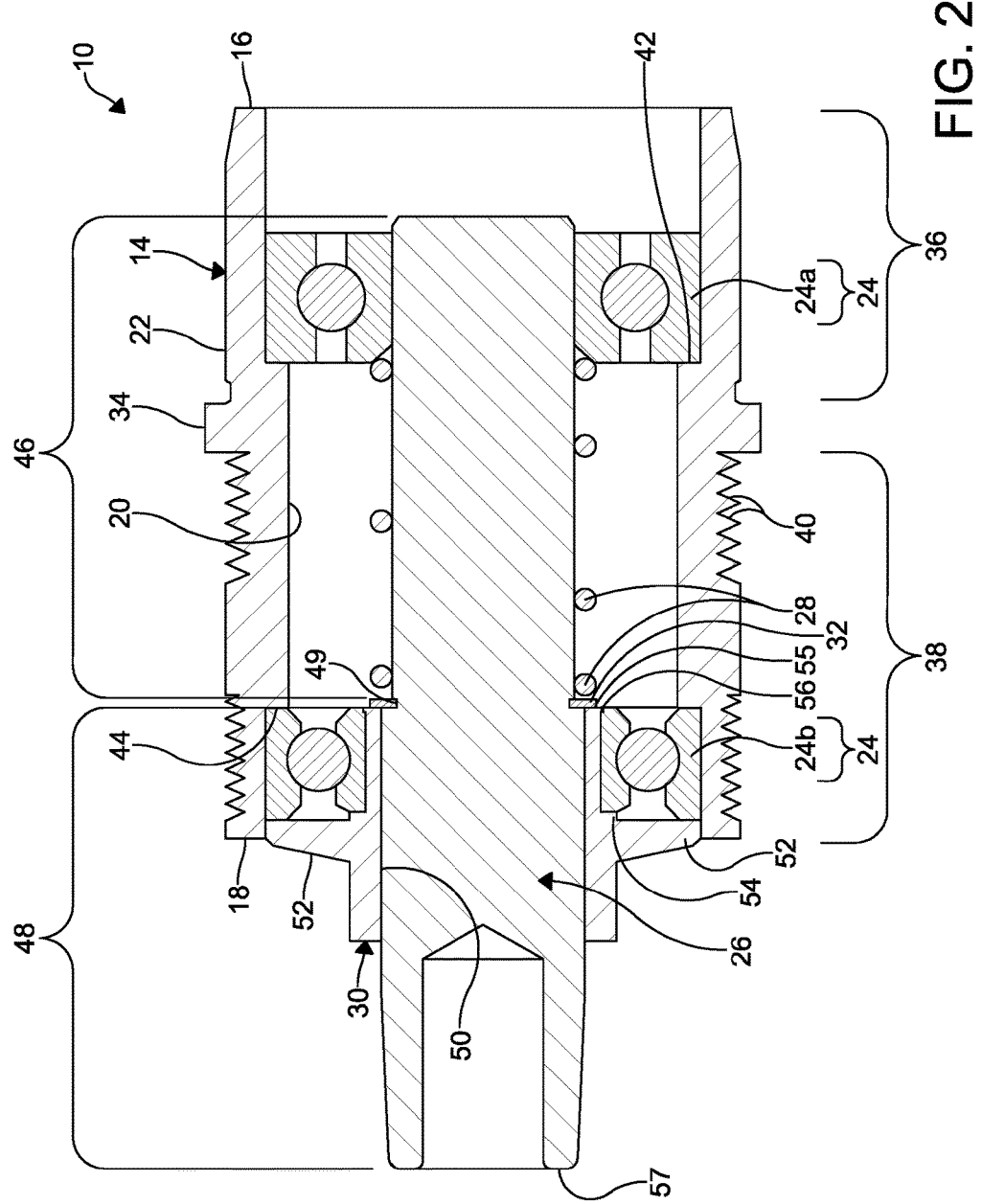
FIG. 2 is a cross-sectional elevational view of the cartridge bearing assembly of FIG. 1.
Figure 4:
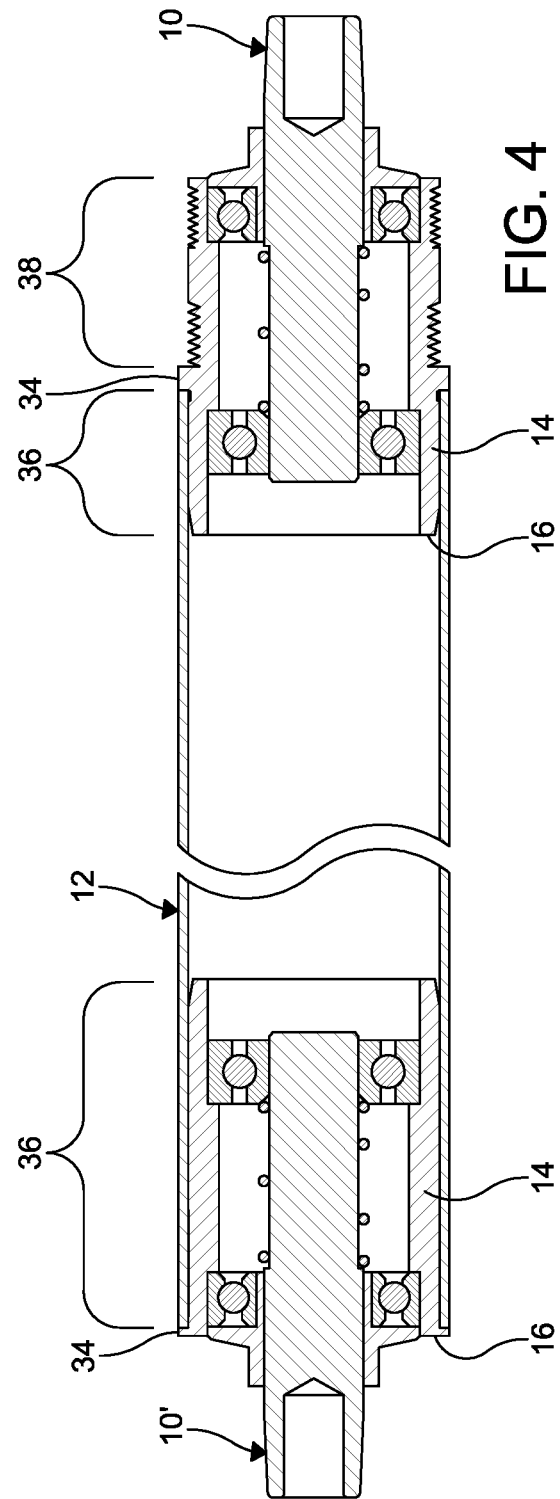
FIG. 4 is a fragmentary cross-sectional elevational view of a pair of the cartridge bearing assemblies of FIGS. 1-2 coupled to opposing ends of a roller.

A diameter of the outer surface 22 of the roller engagement portion 36 is substantially constant but tapers radially inwardly with respect to a central axis of the housing 14 towards the first end 16 of the housing 14 and also towards and flange 34. The tapering is advantageous for inserting the cartridge bearing assembly 10 into the roller 12. The outer surface 22 of the torque transmitter engagement portion 38 includes engagement members 40 formed therein which are configured as a plurality of grooves concentric with respect to the outer surface 22 of the housing 14. The engagement members 40 correspond in shape with a shape of V-shaped protuberances formed on a torque transmitter such as a multi-V type torque transmitter. For example, the multi-V shaped torque transmitter can be a Poly-V type torque transmitter made by Hutchinsom FTS Inc. of Auburn Hills, Mich. The engagement members 40 can be continuously formed along an entire length of the outer surface 22 of the torque transmitter engagement portion 38 or can include a set of a number of the engagement members 40 spaced from another set of a number of the engagement members 40, as shown. In the embodiment shown, the outer surface 22 of the torque transmitter engagement portion 38 permits a pair of torque transmitters to engage the outer surface 22 thereof. It is understood the engagement members 40 are not limited to V-shaped grooves. The engagement members 40 can be any type of engagement members 40 configured to engage a desired torque transmitter such as chain torque transmitters (See FIG. 1B), O-ring torque transmitters, timing belt torque transmitters (See FIG. 1C), or other type of torque transmitter as desired. Examples of types of the engagement members 40 are disclosed in U.S. Pat. No. 9,643,784, the disclosure of which is hereby incorporated herein in its entirety. Additionally, as shown in FIG. 4, the cartridge bearing assembly can not include any engagement members 40.

The inner surface 20 of the housing 14 includes a first shoulder 42 and a second shoulder 44. The first shoulder 42 is spaced from the first end 16 of the housing 14 and the second shoulder 44 is spaced from the second end 18 of the housing 14. A thickness of the housing 14 between the first end 16 of the housing 14 and the first shoulder 42 and between the second end 18 of the housing 14 and the second shoulder 44 is greater than the remaining portions of the housing 14 intermediate the first shoulder 42 and the second shoulder 44. An inner diameter of the housing 14 from the first end 16 thereof to the first shoulder 42 is substantially equal to an inner diameter of the housing 14 from the second end 18 thereof to the second shoulder 44.

An outer surface of each of the bearings 24 engages the inner surface 20 of the housing 14. The bearings 24 are axially aligned with each other and include substantially equal outer diameters. An inner diameter of the second bearing 24b is slightly smaller than an inner diameter of the first bearing 24a to accommodate the insert 30, described in further detail hereinbelow. The first bearing 24a is received in the first end 16 of the housing 14 and engages the first shoulder 42 to militate against the first bearing 24a moving axially in a direction past the first shoulder 42. The second bearing 24b is received in the second end 18 of the housing 14 and engages the second shoulder 44 to militate against the second bearing 24b moving axially in a direction past the second shoulder 44. The bearings 24 are each substantially annular and are a roller bearing type. It should be understood that only two bearings 24 are required for minimal complexity of assembly. However, more or fewer bearings can be included without departing from the scope of the disclosure.

Each of the bearings 24 receives the shaft 26 therein. The shaft 26 includes a spring portion 46 received in the first bearing 24a and a frame engagement portion 48 received in the second bearing 24b and configured for engaging a frame of the roller conveyor system. The shaft 26 does not extend entirely through a length of the roller 12. It is understood the shaft 26 can extend a minimal distance from the first bearing 24a towards the first end 16 of the housing 14 or minimally past the first end 16 of the housing 14. For example, as shown, the shaft 26 only extends from a position within the housing 14 spaced from the first end 16 of the housing 14 to a position at a desired distance outwardly from the second end 18 of the housing 14. The shaft 26 extends through an inner surface of the bearings 24, wherein the bearings 24 support the shaft 26 and allow for rotation of the cartridge bearing assembly 10 around the shaft 26 and thus, allow for rotation of the roller 12. In certain embodiments, as shown, the shaft 26 includes a bore 27 formed at the distal end thereof. Although, in other embodiments, the shaft 26 can be substantially solid and formed without the bore 27.

The shaft 26 includes a circumferentially formed indentation 49 formed intermediate the spring portion 46 and the frame engagement portion 48. The indentation 49 receives the retaining ring 32. The retaining ring 32 has a diameter greater than a diameter of the spring portion 46. The diameter of the spring portion 46 is substantially constant. The frame engagement portion 48 of the shaft 26 has a substantially hexagonal cross-sectional shape. A width across flats and a width across corners of the frame engagement portion 48 are proximate the diameter of the spring portion 46. For example, the width across flats of the frame engagement portion 48 can be within a range of about 0 inches to 0.05 inches less than the diameter of the spring portion 46. In another example, the width across corners of the frame engagement portion 48 is within a range of about 0 to 0.1 inches greater than the diameter of the spring portion 46. As a specific example, the width across flats of the frame engagement portion 48 is 0.75 inches, the width across corners of the frame engagement portion 48 is 0.866 inches, and the diameter of the spring portion 46 is 0.785 inches. It is understood, the spring portion 46 and the frame engagement portion 48 can have other dimensions as desired. The frame engagement portion 48 tapers radially inwardly towards an end of the shaft 26 with respect to an axis extending through the shaft 26.

The spring 28 is positioned intermediate the first bearing 24a and the second bearing 24b. As shown, the spring 28 is a helical spring and encircles the spring portion 46 of the shaft 26 and is seated against the first bearing 24a at a first end and against the retaining ring 32 at a second end. The spring 28 biases the shaft 26 in a direction outwardly from the housing 14 with respect to the second end 18, wherein a portion of the shaft 26 is normally exposed outwardly from the housing 14 to engage the frame of the roller conveyor system. The spring 28 is of a compression type spring. However, the spring 28 can be any type of spring or biasing member as desired to bias the shaft 26 in the direction outwardly from the housing 14 with respect to the second end 18.

Figure 3:
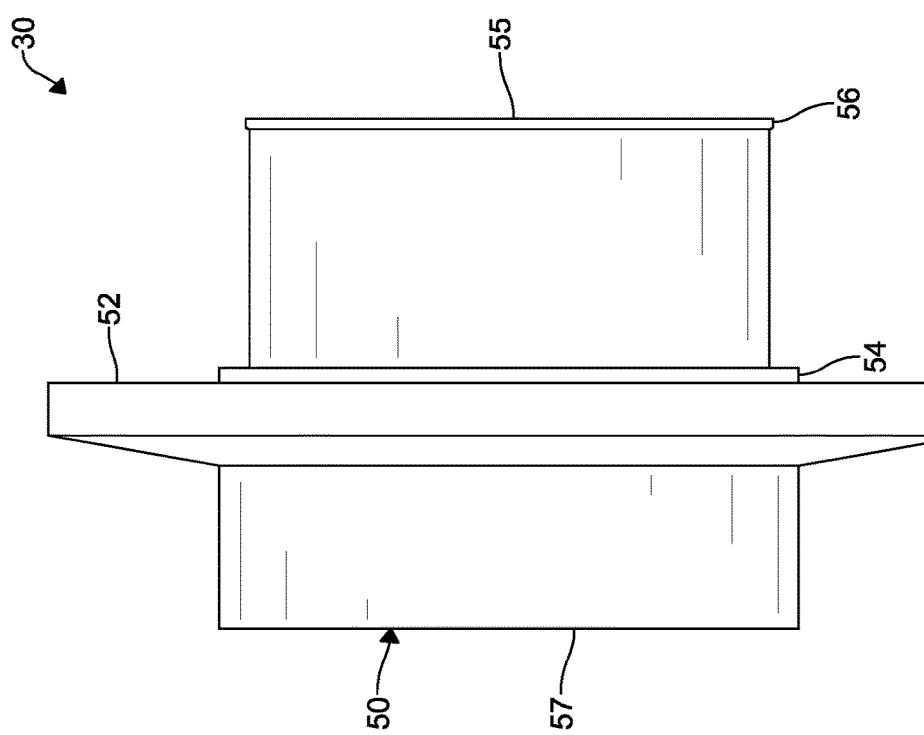
FIG. 3 is an enlarged side elevational view of an insert of the cartridge bearing assembly of FIGS. 1-2.

A first end 55 of the insert 30 may be partially received in the second end 18 of the housing 14 and the second bearing 24b. A second end 57 of the insert 30 extends outwardly from the housing 14. The insert includes a central bore 50 configured to receive the frame engagement portion 48 of the shaft 26. Thus, the central bore 50 has a hexagonal cross-sectional shape to correspond to the hexagonal shape of the shaft 26. As a result, relative rotation between the shaft 26 and the insert 30 is prevented. However, the insert 30 is permitted to rotate with the cartridge bearing assembly 10. A flange 52 extends radially outwardly from an outer surface of the insert 30 at a portion of the insert 30 intermediate the ends 55, 57 thereof. The flange 52 has a diameter slightly smaller than an inner diameter of the housing 14 at the second end 18 of the housing 14 to permit relative rotation between the insert 30 and the housing 14. The flange 52 covers and protects the second bearing 24b and militates against undesired movement of the second bearing 24b. As shown in FIG. 3, the insert 30 includes a stop 54 formed adjacent the flange 52. The stop 54 permits a minimal gap to be formed between the flange 52 and the second bearing 24b. A lip 56 may be formed at the end of the insert 30 to militate against the second bearing 24b moving in an axial direction towards the first end 16 of the housing 14.

According to an embodiment of the disclosure, the housing 14 is formed by an injection molding process and the material used to form the housing 14 is a plastic material. However, other materials and processes can be used to form the housing 14 without departing from the scope of the present disclosure. As shown, the shaft 26 is formed from a steel material. However, in another embodiment, the shaft 26 can be formed from a durable plastic material to minimize damage or wear to the roller conveyor system framing and specifically to a corresponding hexagon-shaped hole for receiving the frame engagement portion 48. For example, the shaft 26 can be formed from Polyoxymethylene (POM), high density polyethylene, or any other plastic as desired. Additionally, the shaft 26 can be coated with a plastic material or a plastic sleeve or insert can receive the shaft 26.

As shown in FIG. 4, the ends of the roller 12, which is tubular, receive the roller engagement portion 36 of the housing 14. The roller engagement portion 36 is coupled to the roller 12 by an interference fit. Although other coupling methods could be employed if desired in lieu of or in addition to the interference fit. The flange 34 militates against the roller 12 extending beyond the flange 34 and into the torque transmitter engagement portion 38, thereby allowing the torque transmitter engagement portion 38 to be exposed. As shown in FIG. 4, a first one of the ends of the roller 12 receives the cartridge bearing assembly 10 having the engagement members 40 and a second one of the ends of the roller receives a cartridge bearing assembly 10' which has no engagement members. In certain application, the rollers 12 are only driven by torque transmitters at the first one of the ends of the rollers 12 adjacent one of the sides of the frame. However, both ends of the rollers 12 can receive the cartridge bearing assembly 10 having the engagement members 40 or both ends of the rollers 12 can receive the cartridge bearing assembly 10' having no engagement members dependent on the application. It is understood the cartridge bearing assembly 10 received at the first one of the ends of the rollers 12 can include no engagement members. Additionally, the second one of the ends of the rollers 12 can receive the cartridge bearing 10 having the engagement members 40. The cartridge bearing assembly 10' with no engagement members is substantially the same as the cartridge bearing assembly 10 with the engagement members 40 except the cartridge bearing assembly 10' with no engagement members only includes the roller engage-portion 36 and does not include the torque transmitter engagement portion 38. The flange 34 of the cartridge bearing assembly 10' with no engagement members is disposed at the first end 16 of the housing 14.

In application, as mentioned previously, the shaft 26 is biased axially outwardly from the cartridge bearing assembly 10 so the frame engagement portion 48 is biased axially outwardly from the housing 14. However, it should be understood, with a force greater than the biasing force of the spring 28, the shaft 26 can be urged inwardly to facilitate insertion of the shaft 26 into the frame of the roller conveyor system. Torque transmitters (not shown) engage the engagement members 40 of the housing 14. A drive assembly is in mechanical communication with at least one of the rollers 12 to provide torque automatically to the rollers 12. The drive assembly is configured as a conveyor drive assembly and can include a motor, a speed reducer (not shown), a drive pulley (not shown), sprockets (not shown), guards, and other components commonly employed with the conveyor drive assembly such as a drive shaft, for example.

Advantageously, the cartridge bearing assembly 10 is easily manufactured and easily assembled and coupled to the roller 12. The cartridge bearing assembly 10 has fewer components compared to prior art assemblies. The cartridge bearing assembly 10 minimizes costs and is more robust and results in less wear to the shaft 26, the cartridge bearing assembly 10, and the frame of the conveyor roller system.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A cartridge bearing assembly for a roller conveyor system comprising:
   a housing having a first end configured for insertion into a roller, a second end opposing the first end, an inner surface, and an outer surface;
   a pair of bearings disposed in the housing and spaced from each other;
   a shaft received by the pair of bearings each of the pair of bearings having substantially equal diameters; and
   a spring disposed about a first portion of the shaft intermediate the pair of bearings, the spring biasing the shaft axially outwardly from the second end of the housing, wherein a plurality of engagement members is formed on an outer surface of the housing configured to engage a torque transmitter, wherein the engagement members are a plurality of grooves concentrically formed on the outer surface of the housing, wherein a flange divides the housing into a roller engagement portion and a torque transmitter engagement portion, and wherein the torque transmitter engagement portion includes the engagement members.

2. A cartridge bearing assembly for a roller conveyor system comprising:
   a housing having a first end configured for insertion into a roller, a second end opposing the first end, an inner surface, and an outer surface;
   a pair of bearings disposed in the housing and spaced from each other, each of the pair of bearings having substantially equal outer diameters;
   a shaft received by the pair of bearings; and
   a spring disposed about a first portion of the shaft intermediate the pair of bearings, the spring biasing the shaft axially outwardly from the second end of the housing, wherein the shaft is divided into a spring portion having a substantially circular cross-sectional shape and a frame engagement portion having a substantially hexagonal cross-sectional shape, and wherein the frame engagement portion has a width across flats of the hexagonal cross-sectional shape and a width across corners of the hexagonal cross-sectional shape substantially equal to or proximate a diameter of the spring portion.

3. The cartridge bearing assembly of claim 2, wherein a plurality of engagement members is formed on an outer surface of the housing configured to engage a torque transmitter.

4. The cartridge bearing assembly of claim 3, wherein the engagement members are a plurality of grooves concentrically formed on the outer surface of the housing.

5. The cartridge bearing assembly of claim 4, wherein each of the plurality of grooves is V-shaped.

6. The cartridge bearing assembly of claim 4, wherein a flange divides the housing into a roller engagement portion and a torque transmitter engagement portion, and wherein the torque transmitter engagement portion includes the engagement members.

7. The cartridge bearing assembly of claim 2, wherein an annular indentation is formed in the spring portion adjacent the frame engagement portion.

8. The cartridge bearing assembly of claim 7, further comprising a retaining ring received in the annular indentation.

9. The cartridge bearing assembly of claim 2, wherein the shaft is formed from one of plastic and steel.

10. The cartridge bearing assembly of claim 2, wherein the inner surface of the housing includes a first shoulder and a second shoulder, the first shoulder spaced from the first end of the housing and the second shoulder spaced from the second end of the housing, and wherein a first one of the pair of bearings engages the first shoulder and a second one of the pair of bearings engages the second shoulder.

11. The cartridge bearing assembly of claim 2, further comprising an insert receiving the shaft, wherein a portion of the insert is disposed intermediate the shaft and at least one of the pair of bearings.

12. The cartridge bearing assembly of claim 11, wherein the insert includes a flange extending radially outwardly from an outer surface thereof, a stop formed adjacent the flange, and a lip formed at a first end of the insert.

13. The cartridge bearing assembly of claim 2, wherein the shaft does not extend beyond the first end of the housing.

14. A cartridge bearing assembly for a roller conveyor system comprising:
   a housing having a first end configured for insertion into a roller, a second end opposing the first end, an inner surface, and an outer surface;
   a pair of bearings disposed in the housing and spaced from each other, each of the pair of bearings having substantially equal outer diameters;
   a shaft received by the pair of bearings;
   a spring disposed about a first portion of the shaft intermediate the pair of bearings, the spring biasing the shaft axially outwardly from the second end of the housing; and
   an insert receiving the shaft, a portion of the insert disposed intermediate the shaft and at least one of the pair of bearings, the insert including a flange extending radially outwardly from an outer surface thereof, a stop formed adjacent the flange, and a lip formed at a first end of the insert.

* * * * *